United States Patent

Stall et al.

[11] Patent Number: 5,607,358
[45] Date of Patent: Mar. 4, 1997

[54] CONNECTION BETWEEN INNER JOINT PART AND DRIVESHAFT

[75] Inventors: Eugen Stall, Neunkirchen; Dieter Sattler, Mühlheim, both of Germany

[73] Assignees: GKN Automotive AG, Lohmar; Löhr & Bromkamp GmbH, Offenbach am Main, both of Germany

[21] Appl. No.: 624,846

[22] Filed: Mar. 26, 1996

Related U.S. Application Data

[63] Continuation of Ser. No. 157,724, Nov. 24, 1993, abandoned.

[30] Foreign Application Priority Data

Nov. 28, 1992 [DE] Germany ............... 42 40 131.3

[51] Int. Cl.$^6$ ............... F16D 3/205; F16D 3/224
[52] U.S. Cl. ............... 464/111; 403/279; 464/143; 464/182
[58] Field of Search ............... 464/111, 143, 464/144, 145, 146, 905, 906, 182; 403/281, 279, 274

[56] References Cited

U.S. PATENT DOCUMENTS

| | | | |
|---|---|---|---|
| 2,374,270 | 4/1945 | Brock | 403/279 |
| 3,936,205 | 2/1976 | Speakman | 403/279 |
| 3,958,389 | 5/1976 | Whiteside et al. | 403/279 |
| 4,244,196 | 1/1981 | Staeheli et al. | 464/145 |
| 5,221,233 | 6/1993 | Jacob | 464/145 |

FOREIGN PATENT DOCUMENTS

| | | |
|---|---|---|
| 359659 | 3/1990 | European Pat. Off. . |
| 2382613 | 9/1978 | France . |
| 2534855 | 4/1984 | France . |
| 1820594 | 10/1960 | Germany . |
| 3710827 | 4/1990 | Germany . |
| 60-152339 | 8/1985 | Japan . |
| 61-188028 | 11/1986 | Japan . |
| 329620 | 4/1988 | Japan . |
| 93/08409 | 4/1993 | WIPO ............... 464/111 |

Primary Examiner—Daniel P. Stodola
Assistant Examiner—Eileen A. Dunn
Attorney, Agent, or Firm—Harness, Dickey & Pierce, P.L.C.

[57] ABSTRACT

A non-rotating and axially secured connection between an inner joint part of a constant velocity joint and a driveshaft has an inner joint part at its outer circumference with tracks for receiving torque-transmitting balls or tripod arms for sliding on rollers, as well as a central bore with inner teeth. The driveshaft is inserted into the bore and is provided with corresponding outer teeth. At the end of the inner joint part facing the shaft end, the bore, with its inner teeth, changes into a through-hole with a smaller diameter. At the end of the driveshaft in front of the outer teeth, a cylindrical portion is provided carrying an axial securing mechanism.

3 Claims, 6 Drawing Sheets

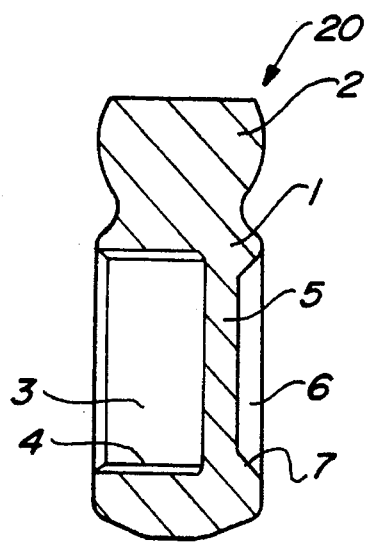
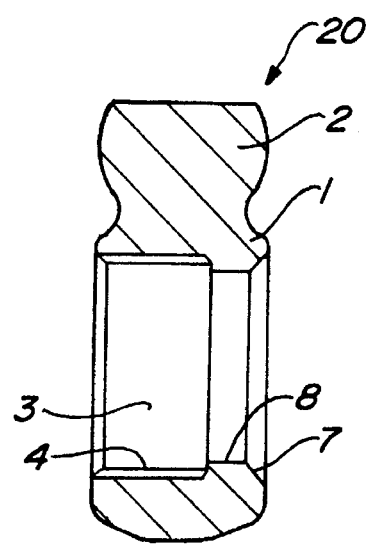
Fig-1A  Fig-1B
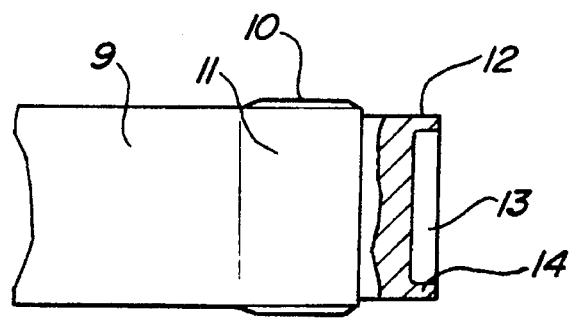
Fig-1C
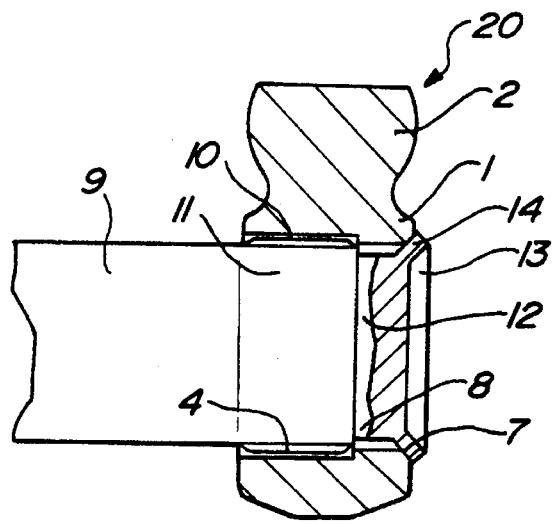
Fig-1D

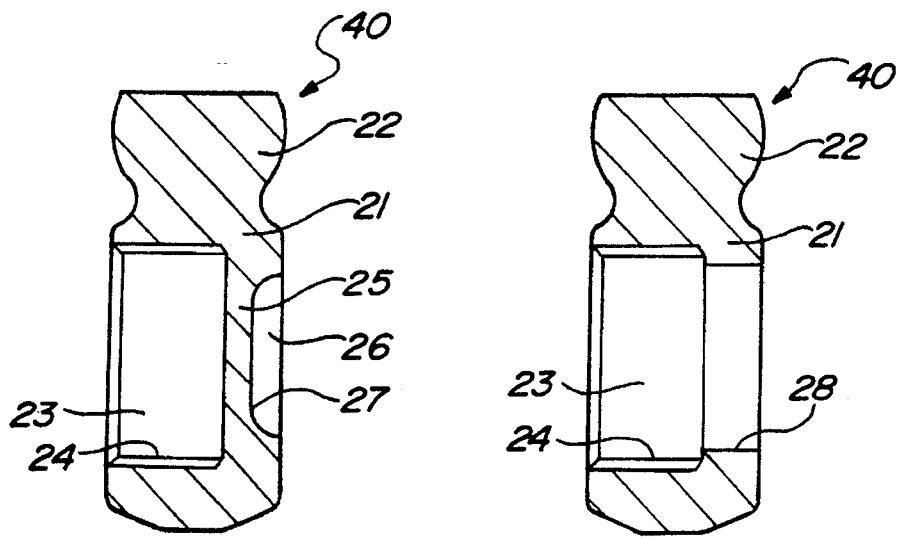
Fig - 2A
Fig - 2B
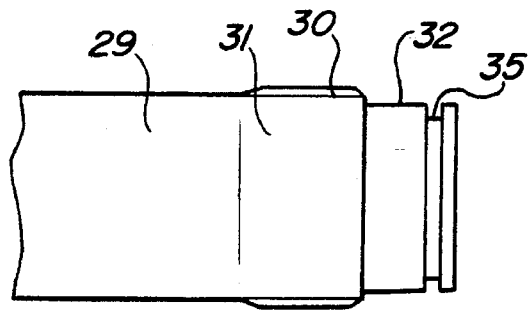
Fig - 2C
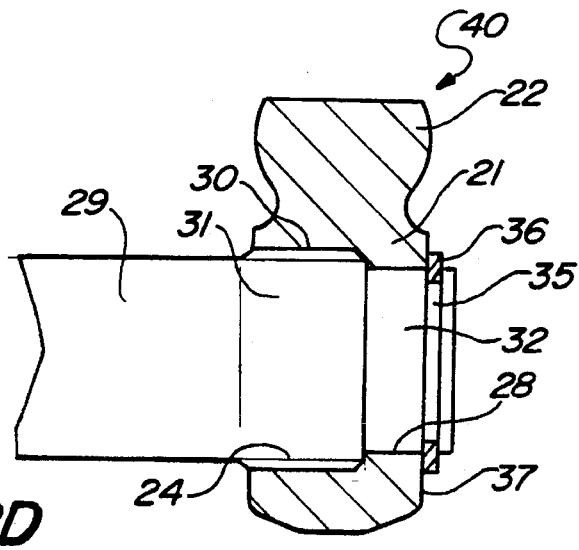
Fig - 2D

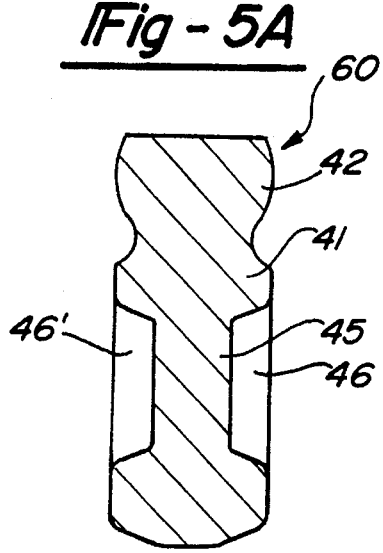
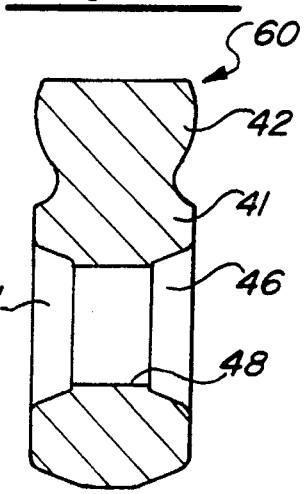
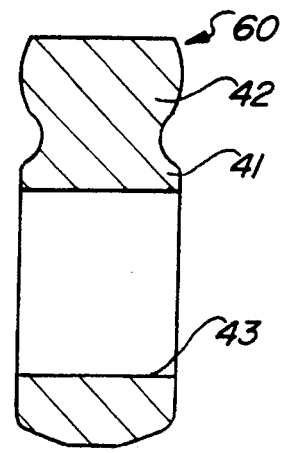
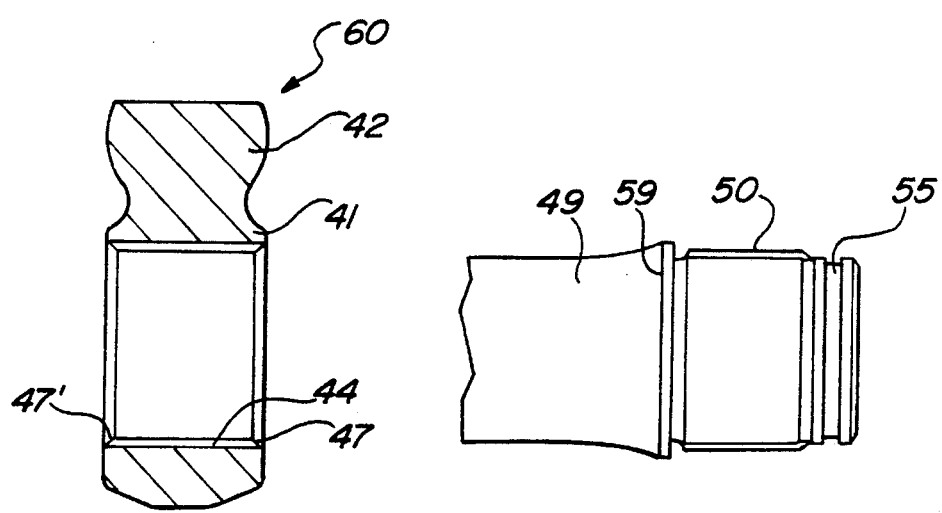
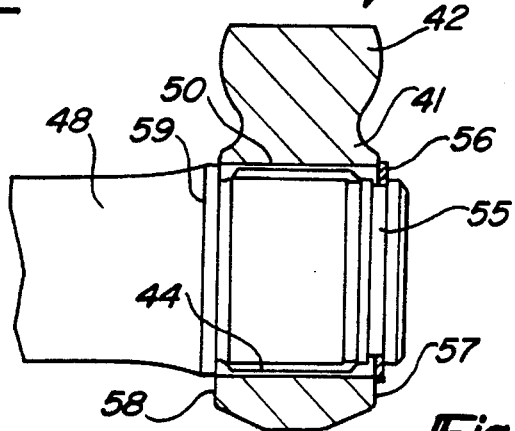
Fig - 5A
Fig - 5B
Fig - 5C
Fig - 5D
Fig - 5E
Fig - 5F
PRIOR ART

CONNECTION BETWEEN INNER JOINT PART AND DRIVESHAFT

This is a continuation of U.S. patent application Ser. No. 08/157,724, filed Nov. 24, 1993, now abandoned.

BACKGROUND OF THE INVENTION

The invention relates to a non-rotating and axially secured connection between an inner joint part of a constant velocity joint. The inner joint part, at its outer circumference includes tracks for receiving torque-transmitting balls or tripod arms for sliding on rollers. Also, the inner joint part includes a central bore with inner teeth. A driveshaft, provided with corresponding outer teeth, is inserted into the bore. The invention also relates to a method of producing the inner joint part and the connection.

Connections of this type have so far been designed in such a way that the inner joint part is provided with a through-hole with continuous inner teeth. For this purpose, a pressing produced for the inner joint part by a non-chip-forming deformation operation is initially provided with opposed cup-shaped regions for the through-hole, whereupon the end wall located therebetween is roughly stamped out. Subsequently, the through-hole is produced by turning, and finally, in the bore prepared in such a way the teeth are produced by broaching. The free end of the respective shaft is provided with outer teeth which have approximately the same length as the inner teeth of the inner joint part and which are followed by a stop collar. An annular groove is produced at the end of the shaft. The inner joint part is slid onto the shaft end and axially secured thereon by means of a securing ring inserted into the annular groove. The outer teeth at the shaft end may be produced in a non-chip-forming way by curling. With this type of connection and the method of producing it, it is particularly disadvantageous that the operation of producing the inner teeth at the inner joint part takes place in three consecutive process stages. (See FIGS. 5a through 5f.)

SUMMARY OF THE INVENTION

It is therefore an object of the invention to improve a connection of the above-mentioned type in such a way that the method of producing the parts is simplified without adversely affecting the safety of the connection. In addition to the above, the invention simplifies the method of assembling the parts to form the finished connection.

The objective is achieved by, at the end of the inner joint part facing the shaft end, the bore, with its inner teeth, changes into a through-hole with a smaller diameter. At the end of the driveshaft, in front of the outer teeth, a cylindrical portion is provided carrying an axial securing means. An inner joint part with the above-described characteristics can be produced in a smaller number of process stages in a simplified way. The pressing produced by non-chip-forming deformation is provided with a bore which extends over a substantial part of its axial length and which includes finished pressed-in inner teeth. In a further process stage the pressing may then be punched continuously on a smaller inner diameter so that the inner joint part is already complete after a second process stage. The resulting position of change in diameter between the bore and through-hole constitutes a first means for axially securing the parts in a first direction. The respective driveshaft is produced in a way which has not changed, e.g. the shaft teeth may be curled in a part which has been upset for example, and subsequently, the means for receiving or constituting the second axial securing means are prepared at the free shaft end. This may be achieved in a conventional way by cutting an annular groove which holds a securing ring.

According to a second advantageous design, the shaft end is provided with a central hollow space which forms a cylindrical projection. The projection axially secures the shaft relative to the inner joint part. The projection may be radially beaded open so that it rests against an end face of the inner joint part, thus constituting the securing means. In a preferred embodiment, the counter face of the inner joint part, a radial end face or a conical aperture is provided with teeth into which the cylindrical projection is pressed in a form-fitting way. To achieve a non-rotating connection, the teeth at the open end of the through-aperture do not have to correspond in any way to the inner teeth of the inner joint part. The latter embodiment in particular is distinctly cheaper than a design involving the production of an annular groove and the use of a separate securing ring. The design of the connection is simplified and the length of the means for achieving a non-rotating connection is changed only slightly, so that the amount of transferable torque is reduced only slightly, although the latter may be compensated for by increasing the axial length of the inner joint part. Production of the reciprocal axial securing means is more advantageous so that it is possible to reduce costs.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments of the invention and of the production and connecting methods are explained below as compared to the state of the art and illustrated in the drawing wherein:

FIGS. 1a through 1d illustrate a first embodiment of a method of producing the connection in accordance with the invention in two process stages at the inner joint part of a tripod joint, the adapted driveshaft, and the connection composed of the two parts.

FIGS. 5a through 5f illustrate a connection according to the state of the art involving the conventional method of producing the inner joint part in four process stages, the driveshaft adapted thereto and the resulting connection including a securing ring.

DETAILED DESCRIPTION OF THE PREFERRED EMBODIMENT

Figure 2E:
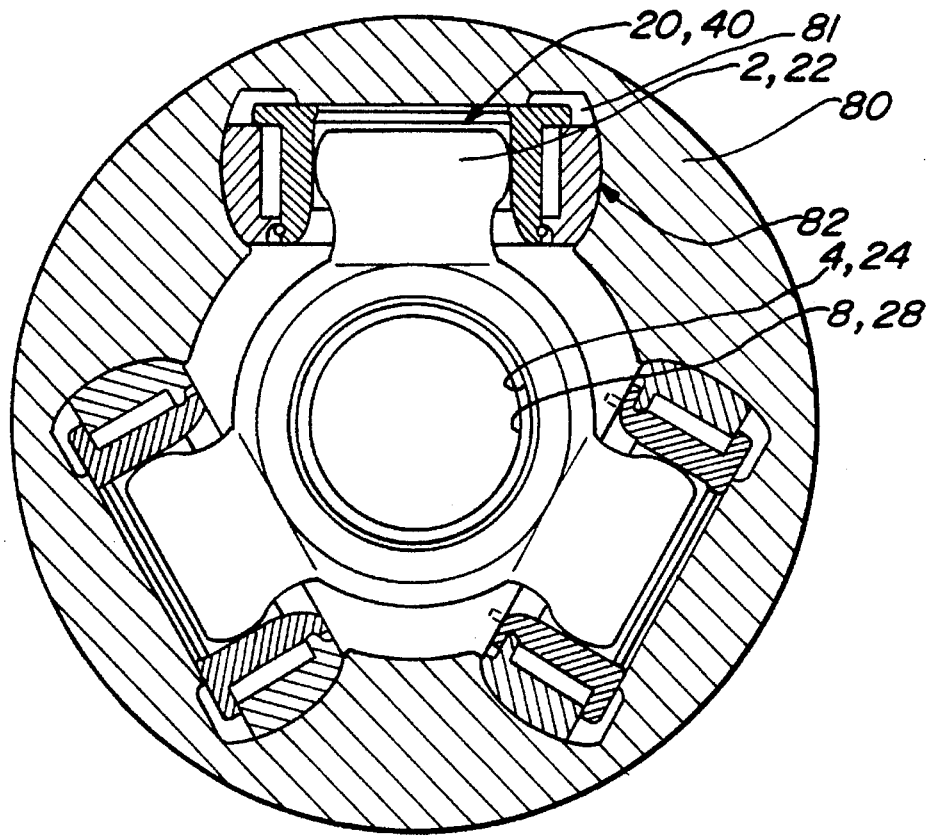
FIG. 2e illustrates a tripod joint in cross section incorporating an inner joint member according to the method shown in FIGS. 1a and 1b and in FIGS. 2a and 2b, respectively.

Below, FIGS. 1a to 1d will be described jointly. Any details corresponding to one another have been given the same reference numbers.

FIG. 1a is a longitudinal section of a pressing of an inner joint part 20 of a tripod joint. A central annular part 1 and one of three radially extending circumferentially distributed tripod arms 2 are shown. The tripod arm 2 includes a part-spherical outer face. An axial bore 3 with inner teeth 4 is pressed into the central inner part 1. An end wall 5 remains at the end of the bore 3 as a result of the pressing process. At the opposite end of the end wall 5 a pressed-in region 6 is provided with an internally conical circumferential face 7. A workpiece if this kind can be produced in a single-stage deformation process.

FIG. 1b shows the same details as FIG. 1a. However, in a further process stage, the previously mentioned end wall 5 is removed by a stamping or punching operation. It is replaced by a through-hole 8 whose inner diameter is smaller than that of the bore 3 with the inner teeth 4. At the opposite end of the inner teeth 4, the through-hole 8 is followed by the original pressed-in region 6 with the conical inner face 7. The inner joint part is thus completed as a result of the second deformation operation.

Figure 1C:
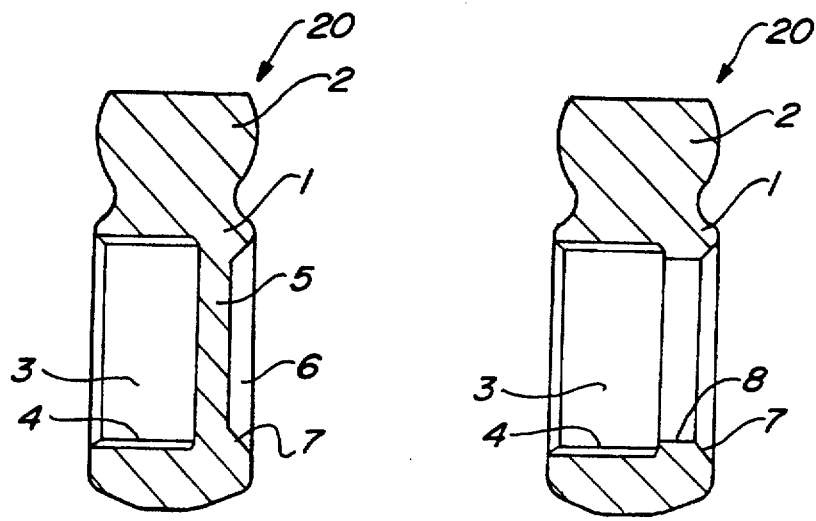

FIG. 1c shows a driveshaft 9 which, at a certain distance from its free end, carries outer teeth 10 which may be helical for example. The length of the outer teeth 10 substantially corresponds to the length of the inner teeth 4. If the outer teeth 10 are shorter than the inner teeth 4, they have to be provided on a collar region 11, as illustrated in the embodiment. The collar region 11 is followed by a cylindrical portion 12 whose outer diameter is adapted to the free inner diameter of the through-hole 8 at the inner joint part. The free end of the driveshaft 9 is provided with an axial recess 13 which forms an annular projection 14 at the shaft end.

Figure 1C:
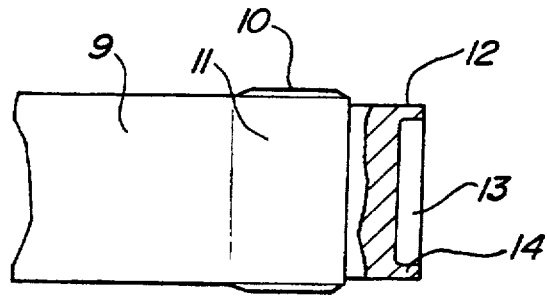
Figure 1D:
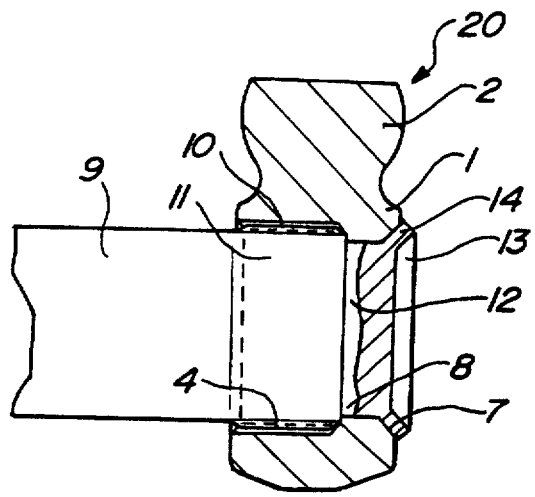

FIG. 1d shows how the driveshaft 9 is axially inserted into the inner joint part. The teeth engage and the end of the collar 11 stops against the position of change of diameter between the inner teeth 4 and the through-hole 8. In a final deformation stage, the original annular projection 14 is expanded and beaded open in such a way that it rests against the conical face 7 of the inner joint part and itself assumes a conical shape. In this way, the inner joint part is axially secured relative to the driveshaft. in a further process stage, which is not carried out in this case and the results of which are therefore not identifiable, it is possible, prior to deforming the cylindrical projection 14, to provide the conical face 7 with toothed elements or notches of a different kind into which the projection may be pressed in a form-fitting way. The fit between the through-hole 8 and the cylindrical portion 12 should preferably be dimensioned such that, if bending loads occur between the driveshaft and inner joint part, the two faces are in contact with one another and accommodate supporting forces.

In FIG. 2, the reference numbers of any details corresponding to those of FIG. 1 have been increased by 20. The process stages for producing the inner joint part and thus the results of the first and second deformation processes as illustrated in FIGS. 2a and 2b very largely correspond to those of FIGS. 1a and 1b.

Figure 2A:
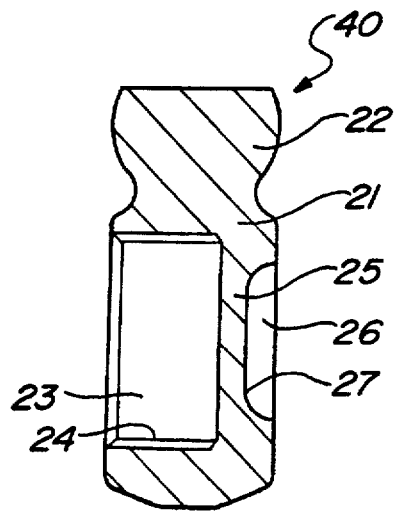
FIGS. 2a through 2d illustrate a modified embodiment of the method of producing the connection in accordance with the invention in two process stages at the inner joint part of a tripod joint, the adapted driveshaft, and the connection composed of the two parts.

FIG. 2a shows the inner joint part 40 including a central annular part 21 and one of three circumferentially distributed tripod arms 22. The annular part has a bore 23 with inner teeth 24. There exists only a slight difference in that the pressed-in region 26 positioned at the opposite end of the end wall 25 with reference to the inner teeth 24, does not include an internally conical face but a cup-shaped face 27. The cup-shaped face 27 serves to prepare a slightly modified stamping or punching operation producing an internally cylindrical continuous through-hole 28 without steps or a conical face.

Figure 2B:
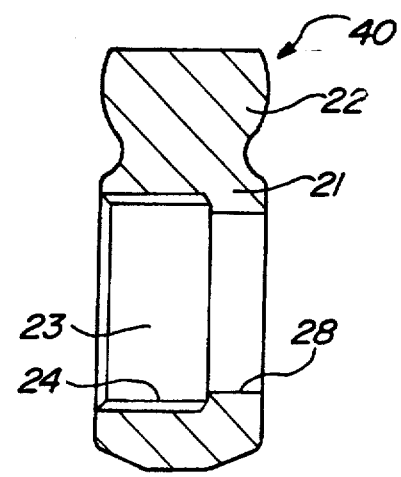
Figure 2C:
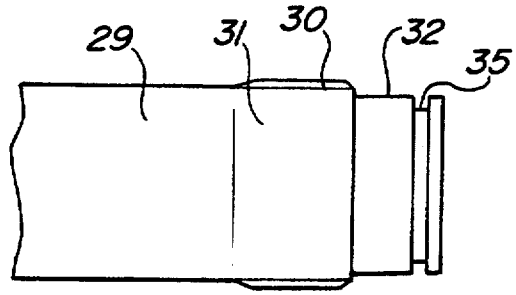

FIG. 2c shows a driveshaft 29 which is adapted to the inner joint part according to FIG. 2b and which also includes a collar 31 carrying outer teeth 30. In the adjoining region, the diameter of the shaft end is reduced and forms a cylindrical portion 32 whose outer diameter is adapted to the inner diameter of the through-hole 28. The outer end of the cylindrical portion 32 is provided with an annular groove 35.

Figure 2D:
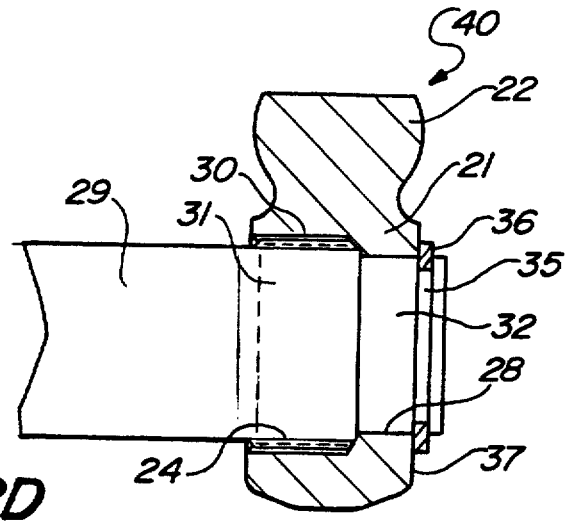
Figure 3C:
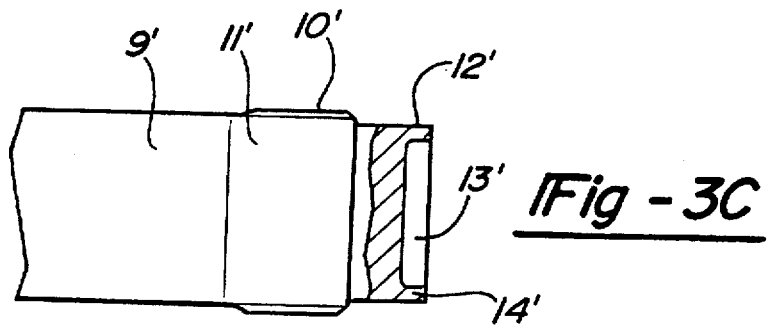
Figure 3D:
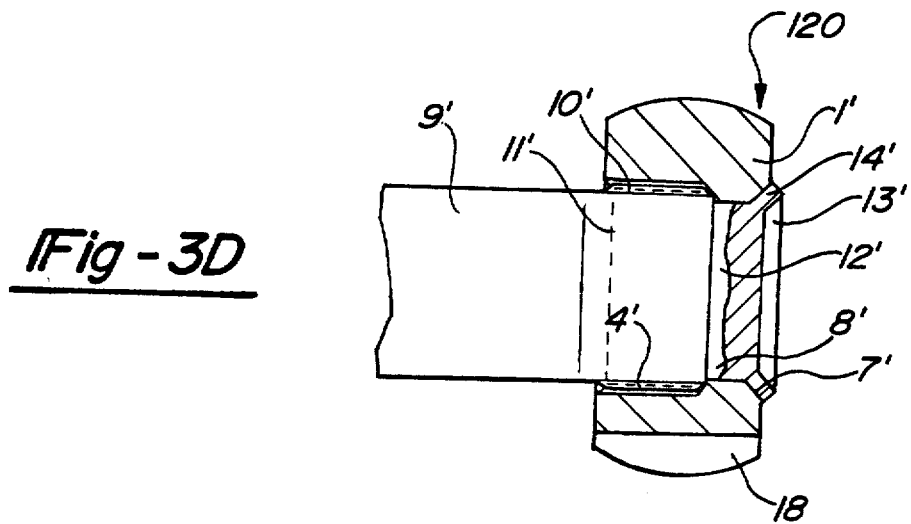
Figure 4A:
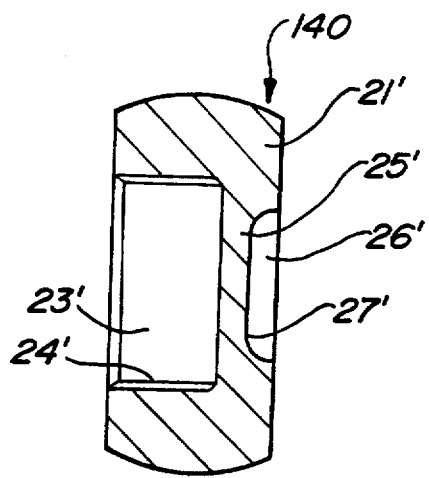
Figure 4B:
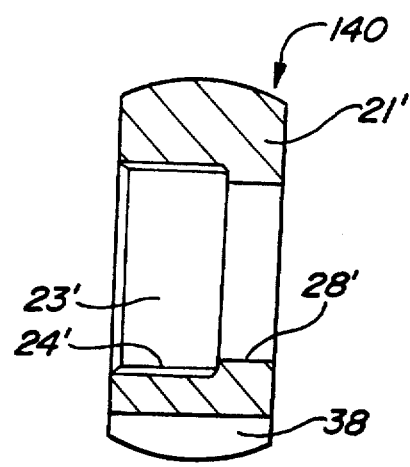
Figure 4C:
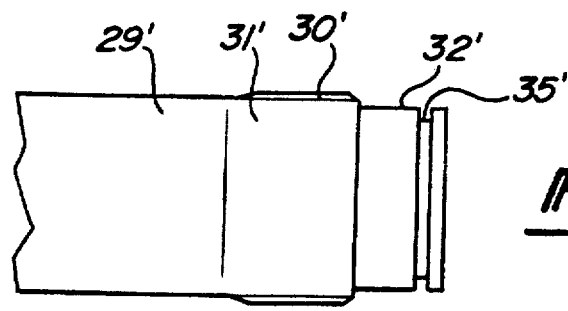
Figure 4D:
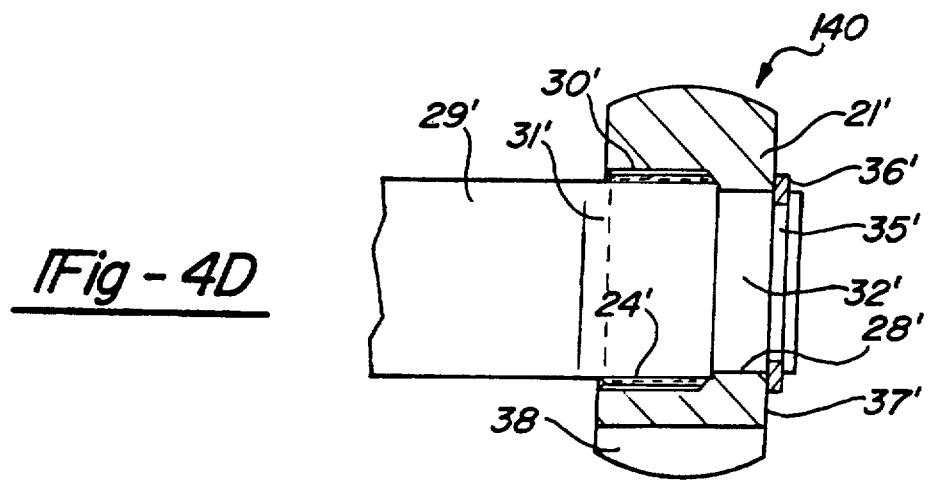
Figure 4E:
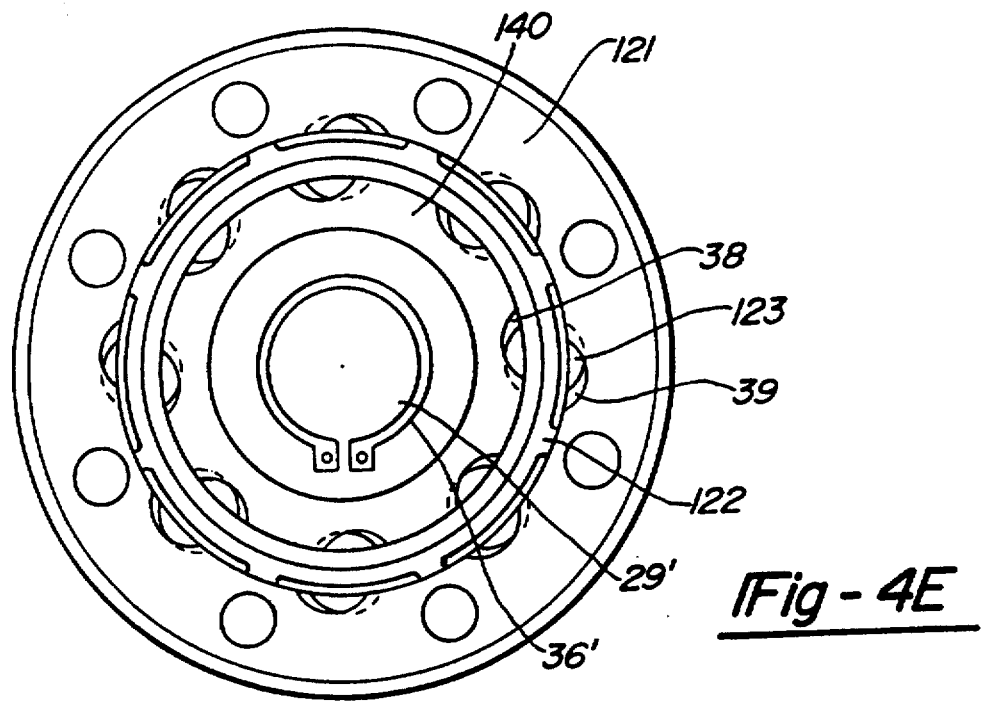

FIG. 2d shows the finish-assembled connection, with the driveshaft 29 being inserted into the inner joint part 40 far enough to allow the stepped transition between the collar 31 and the cylindrical portion 32 to stop against the position of change of diameter between the inner teeth 24 and the through-hole 28 in the inner joint part. The teeth engage one another. The fit between the cylindrical portion 32 and the through-hole 28 should be dimensioned such that if any bending forces occur between the driveshaft and inner joint part, the faces contact one another and accommodate the bending forces. The annular groove 35 contains a securing ring 36 which rests against an end face 37 at the inner joint part, thus constituting an axial securing means between the inner joint part and shaft end.

In FIG. 2e a complete tripod joint in cross section is shown incorporating an inner joint member 20, 40 according to FIG. 1b and 2b. Also shown is an outer joint member 80, including three circumferentially distributed grooves 81, and roller assemblies 82 slid on the arms 2, 22 of the inner joint member 20, 40. The drive shaft is not assembled so that the inner teeth 4, 24 as well as the through hole 8, 28 of a smaller diameter can be recognized.

In FIGS. 3a through 3d the reference numbers of any corresponding details are in accordance to those of FIGS. 1a through 1d, but provided with a '. The FIGS. "3" deviate from the corresponding FIG. "1" in that there is no tripod arm on the inner joint member 120, but one of the ball grooves 18 shown in axial section, which is formed in a non-chip-forming or a machining method step.

In FIGS. 4a through 4d the reference numbers of any corresponding details are in accordance to those of FIGS. 2a through 2d, again provided with a '. The FIG. "4" deviate from the corresponding FIG. "2" in that there is no tripod arm on the inner joint member 140, but a ball groove 38 shown in axial section, which is formed in a non-chip-forming or in a machining method step.

Figure 4A:
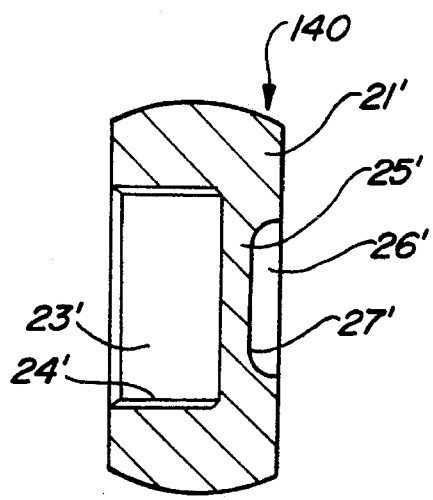
FIGS. 4a through 4d illustrate a modified embodiment of the method of producing the connection in accordance with the invention in two process stages at the inner joint part of a ball joint, the adapted drive shaft and the connection composed of the two parts.
Figure 4B:
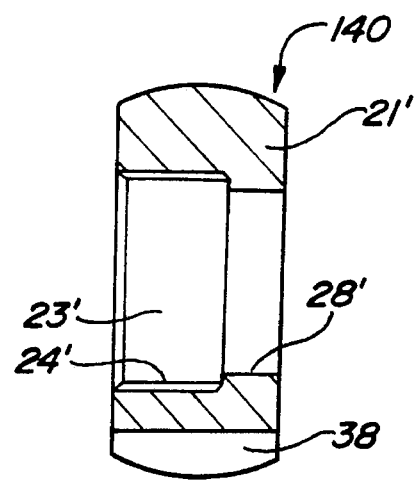
Figure 4C:
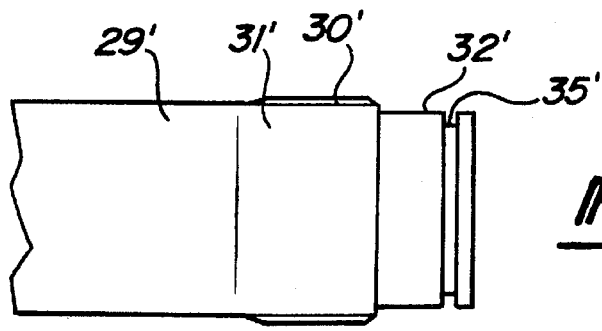
Figure 4D:
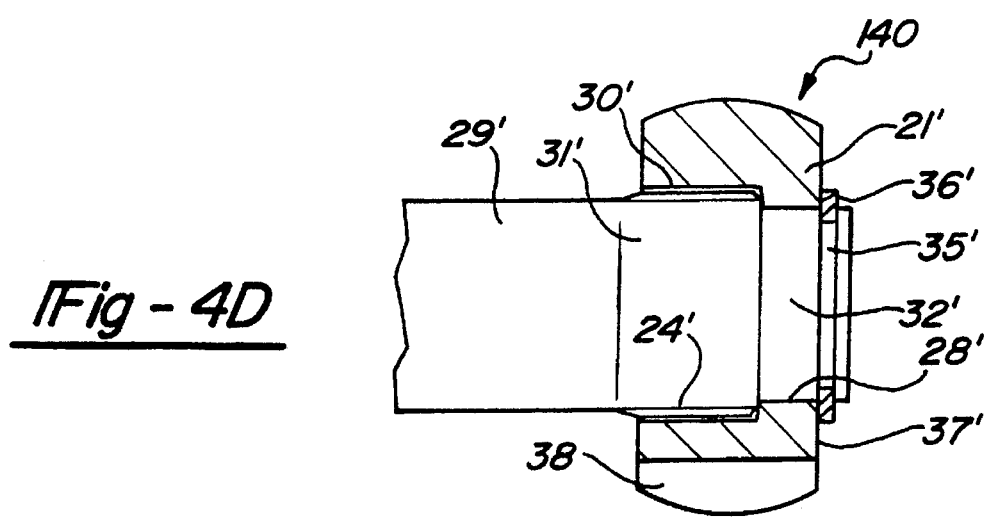
Figure 4E:
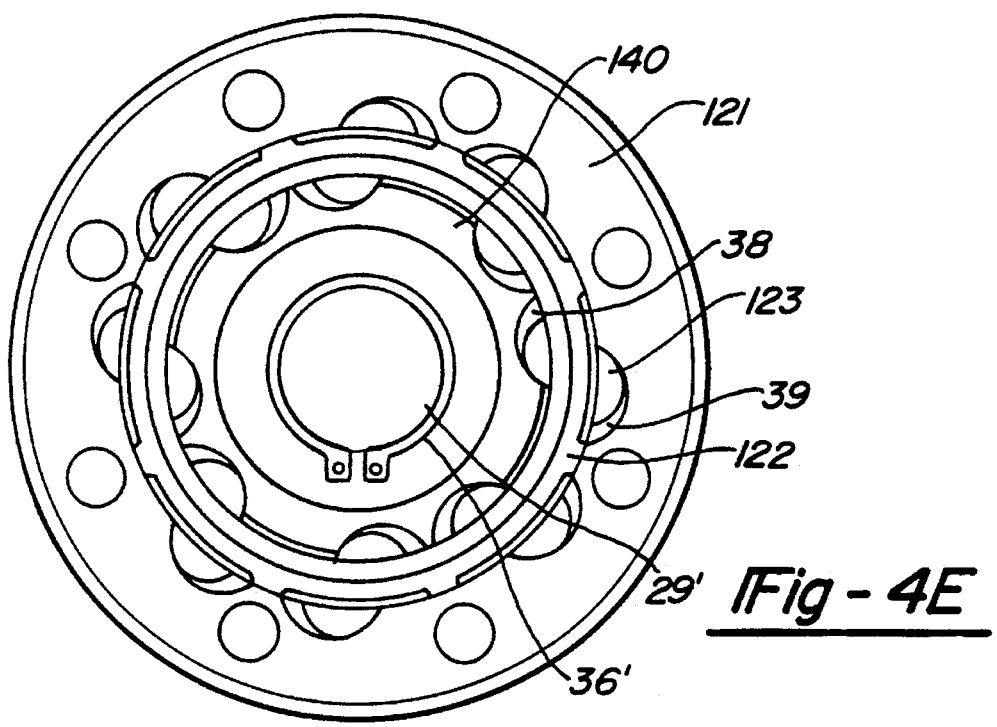
FIG. 4e illustrates a complete constant velocity ball joint incorporating an inner joint part and a drive shaft according to FIG. 4d in axial view.

In FIG. 4e there is a complete constant velocity ball joint wherein an inner joint member 140, an outer joint member 121 and a ball cage 122 is shown. Ball grooves 38 of the inner joint member 140 correspond to ball grooves 39 of the outer joint member 121. In each pair of axially inclined ball grooves 38, 39 there is a torque transmitting ball 123. The inner joint member 140 is secured to the end of the drive shaft 29' by means of a securing ring 36'. This securing ring 36' may as well be replaced by the beaded cylinder part 14' of FIG. 3d.

In FIG. 5, the reference numbers of any details corresponding to those of FIG. 2 are again increased by 20. However, FIG. 5 deviates from FIGS. 1 and 2 in that it shows an inner joint part designed and produced in accordance with the state of the art.

FIG. 5a shows a complete pressing of an inner joint part with an annular part 41 and one of three tripod arms 42. At opposite ends there are provided identical and equally deep pressed-in regions 46, 46' of a relatively small depth between which regions remains a solid central end wall 45.

FIG. 5b shows the subsequent process stage in the course of which, as a result of a stamping or punching operations a through-hole 48 is produced with a small diameter which connects the two pressed-in regions. The entire aperture consists of a central cylindrical portion and two approximately conical portions.

FIG. 5c shows an expanded and continuous internally cylindrical aperture 43 produced by turning in a further third process stage.

FIG. 5d shows inner teeth 44 produced by broaching, i.e. a fourth process stage, in the above-mentioned inner aperture 43. In a further process stage, chamfers 47 are produced at the end of the inner aperture 43.

FIG. 5e shows the shaft end of a driveshaft 49 which carries outer teeth 50 and an annular groove 55. this design is similar to that illustrated in FIG. 2d. Towards the shaft end, the outer teeth 50 finish by comprising a collar 59 whose outer diameter is greater than that of the outer teeth.

Figure 5F:
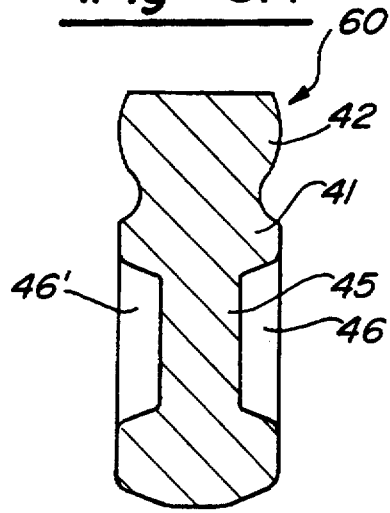
Figure 5F:
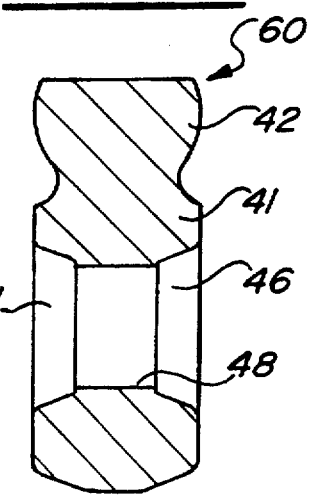
Figure 5F:
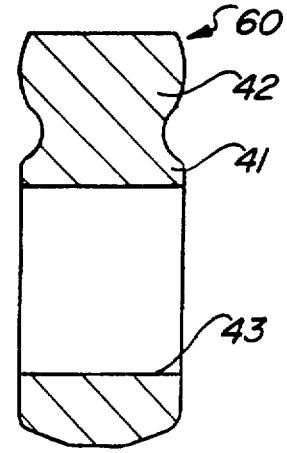
Figure 5F:
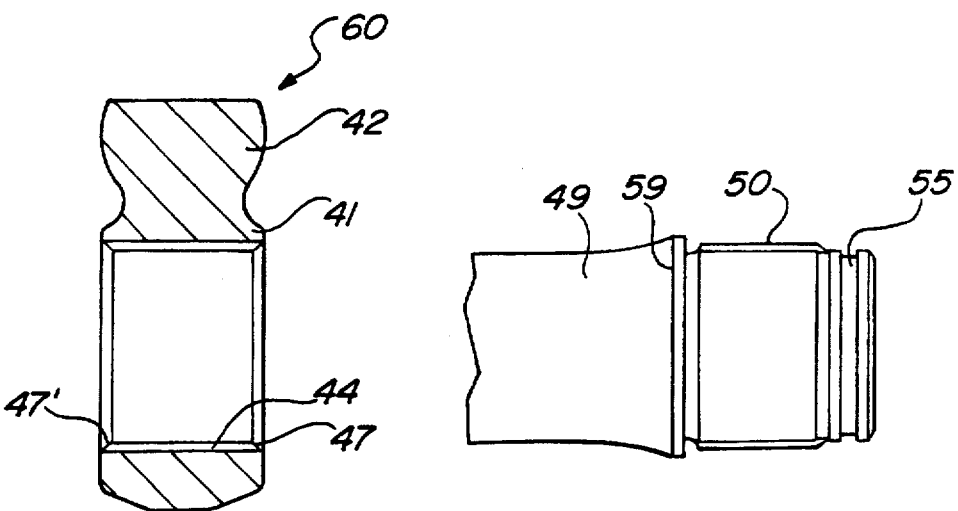
Figure 5F:
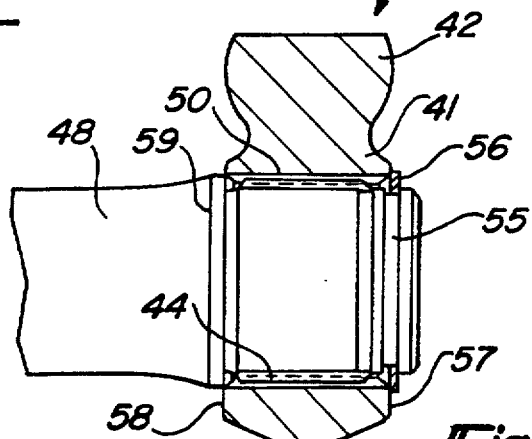

FIG. 5f shows the finish-assembled connection of the previously described parts. The shaft end of the driveshaft 49 is inserted into the inner joint part far enough to allow the collar 59 to stop against the second end face 58 of the inner joint part 60. At the opposite end, i.e. towards the free shaft end, a securing ring 56 is inserted into the annular groove 55 and rests against the outer and face 57 of the inner joint part 60 to provide axial security.

While the above detailed description describes the preferred embodiment of the present invention, the invention is susceptible to modification, variation, and alteration without deviating from the scope and fair meaning of the subjoined claims.

We claim:

1. A non-rotating and axially secured connection between an inner joint part of a constant velocity universal joint and a driveshaft comprising:

an inner joint part having an outer circumference and a central bore with inner teeth;

a driveshaft inserted into said bore and including corresponding outer teeth for engaging said inner teeth;

at an end of the inner joint part facing a driveshaft end, said bore with its inner teeth changes into a through-hole with a smaller diameter, and at the end of the driveshaft, before the outer teeth, a cylindrical portion is provided carrying axial securing means for securing said inner joint part to said driveshaft said securing means is formed by a beaded collar which rests against a contact face of the inner joint part adjacent the end of the driveshaft.

2. A connection according to claim 1, wherein the shaft end inside the collar includes an end recess.

3. A connection according to claim 1, wherein an annular edge of the through-hole adjacent the end of the driveshaft facing the driveshaft end is provided with teeth the collar being formed into said teeth.

* * * * *

UNITED STATES PATENT AND TRADEMARK OFFICE
CERTIFICATE OF CORRECTION

PATENT NO.   : 5,607,358
DATED        : March 4, 1997
INVENTOR(S)  : Eugen Stall, et. al.

It is certified that error appears in the above-identified patent and that said Letters Patent is hereby corrected as shown below:

Drawings:

Delete Drawing Sheets Figs. 1-5F and substitute therefor the Drawing Sheets, consisting of Figs. 1- 5F, as shown on the attached pages.

Signed and Sealed this

Fifth Day of August, 1997

Attest:

BRUCE LEHMAN

*Attesting Officer*          *Commissioner of Patents and Trademarks*

Fig-1A  Fig-1B

Figure 3A:
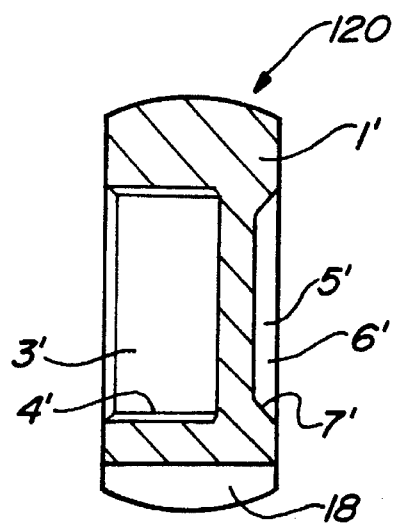
FIGS. 3a through 3d illustrate a first embodiment of a method of producing the connection in accordance with the invention in two process stages at the inner joint part of a ball joint, the adapted drive shaft and the connection composed of the two parts.
Figure 3B:
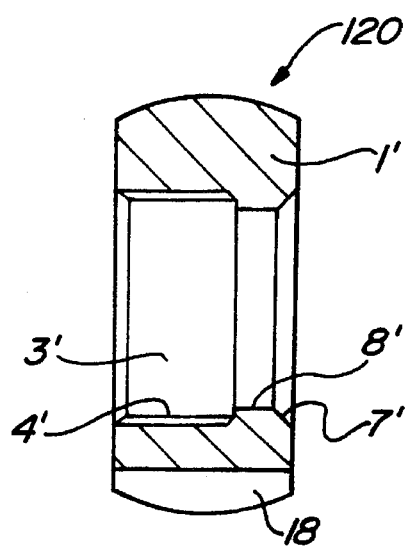
Figure 3C:
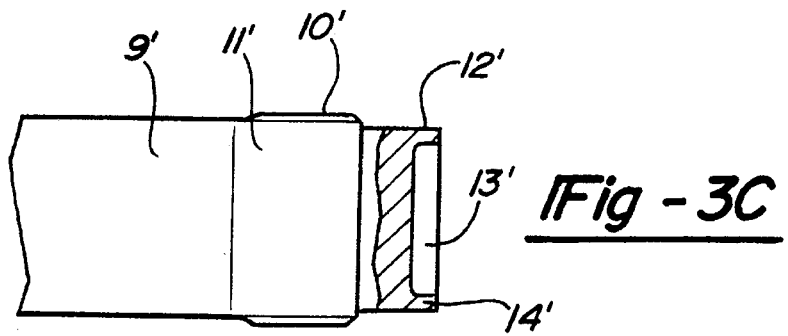
Figure 3D:
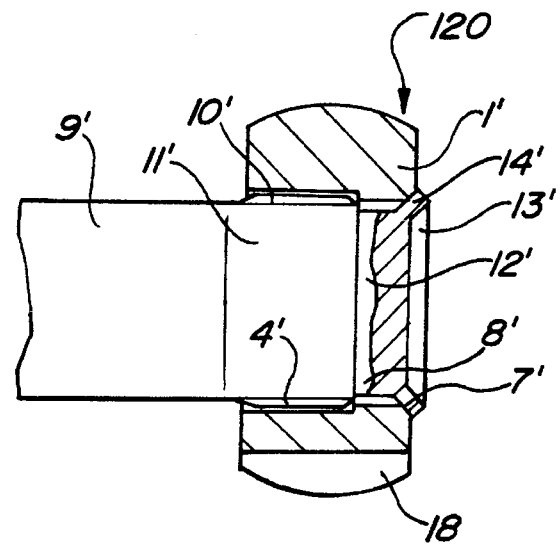

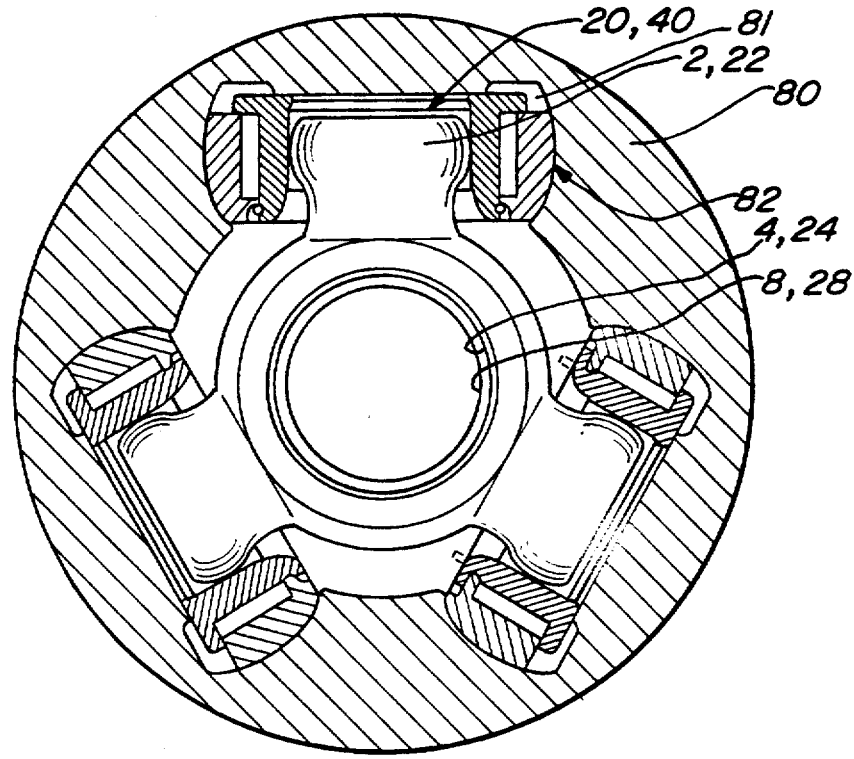
*Fig - 2E*
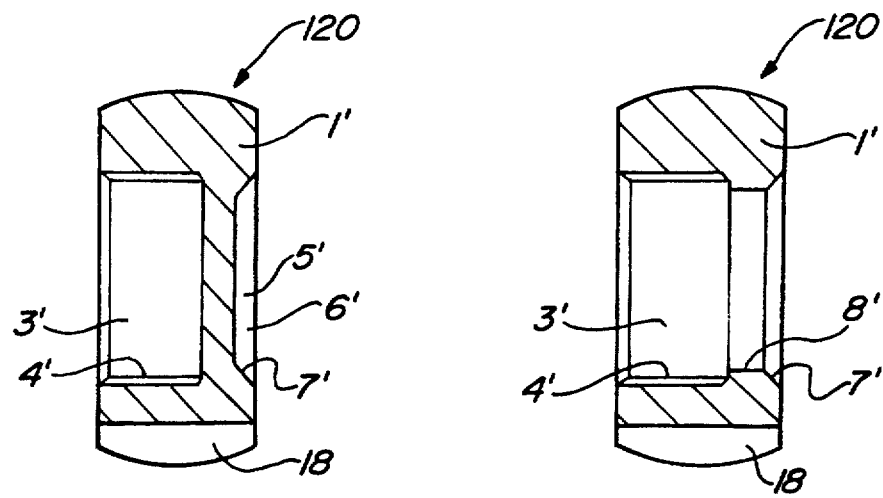
*Fig - 3A*   *Fig - 3B*